United States Patent
Pruitt

(10) Patent No.: US 9,238,404 B2
(45) Date of Patent: Jan. 19, 2016

(54) RADIATOR SUPPORT BRACKET ASSEMBLY

(71) Applicant: Randall Industries, Inc., Romulus, MI (US)

(72) Inventor: John R. Pruitt, Riverview, MI (US)

(73) Assignee: Randall Industries, Inc., Romulus, MI (US)

( * ) Notice: Subject to any disclaimer, the term of this patent is extended or adjusted under 35 U.S.C. 154(b) by 0 days.

(21) Appl. No.: 14/809,832

(22) Filed: Jul. 27, 2015

(65) Prior Publication Data

US 2015/0328978 A1    Nov. 19, 2015

Related U.S. Application Data

(63) Continuation of application No. 14/081,418, filed on Nov. 15, 2013, now Pat. No. 9,090,159.

(51) Int. Cl.
*B60K 11/04* (2006.01)

(52) U.S. Cl.
CPC ...................... *B60K 11/04* (2013.01)

(58) Field of Classification Search
CPC ....................................................... B60K 11/04
USPC ........................................... 165/69, 149, 155
See application file for complete search history.

(56) References Cited

U.S. PATENT DOCUMENTS

| | | | |
|---|---|---|---|
| 2,115,124 A * | 4/1938 | Schittke ..................... | F01P 5/04 12/146 M |
| 4,763,723 A | 8/1988 | Granetzke | |
| 5,199,522 A * | 4/1993 | Martenas ............... | B60K 13/02 180/68.3 |
| 5,558,310 A | 9/1996 | Furuie et al. | |
| 5,816,350 A * | 10/1998 | Akira .................. | B60H 1/3227 180/68.1 |
| 5,975,197 A | 11/1999 | Kado | |
| 6,059,019 A * | 5/2000 | Brost ........................ | F01P 3/18 123/41.51 |
| 6,237,676 B1 | 5/2001 | Hasegawa et al. | |
| 6,357,521 B1 | 3/2002 | Sugimoto et al. | |
| 7,089,994 B2 * | 8/2006 | Esposito ................ | B60K 11/04 165/42 |
| 7,243,710 B2 | 7/2007 | Shinhama | |
| 7,243,751 B2 | 7/2007 | Shigematsu | |
| 7,413,397 B2 * | 8/2008 | Muramoto ............ | E02F 9/0891 180/68.4 |
| 7,703,730 B2 | 4/2010 | Best, Jr. et al. | |
| 8,210,299 B2 | 7/2012 | Streeter | |

* cited by examiner

*Primary Examiner* — John Walters
*Assistant Examiner* — James Triggs
(74) *Attorney, Agent, or Firm* — Bill C. Panagos; J. Scott Martin; Butzel Long, P.C.

(57) ABSTRACT

A radiator comprising a radiator support bracket assembly is disclosed. The radiator has a core that is contained within a shell having two opposed longitudinal members and two opposed transverse members. The support bracket assembly comprises a bracket member and at least one of the longitudinal members that forms part of the shell. The longitudinal member has a length and a width sufficient to accommodate at least one side of a radiator assembly. The bracket member attaches at one end to the longitudinal member and is adapted to overfit internal coolant tubes of the radiator's core. The bracket member has a planar back and two opposed side members. The bracket member is equipped with at least one aperture along its planar back that is complementary to at least one coolant tube to permit insertion of the bracket member over the coolant tube such that the tube extends through the aperture.

20 Claims, 3 Drawing Sheets

RADIATOR SUPPORT BRACKET ASSEMBLY

CROSS-REFERENCE TO RELATED APPLICATIONS

The following continuation application claims the benefit of U.S. patent application Ser. No. 14/081,418, filed on Nov. 15, 2013, which is hereby incorporated by reference in its entirety.

BACKGROUND

Radiator assemblies for internal combustion engines are subjected to vibrational forces during operation of the engine. There have been issues with shock loads and engine vibrations being transmitted to the radiator, resulting in less than optimal radiator service life. Thus, there is a need for a vibration dampened radiator assembly that provides optimal radiator service life.

SUMMARY

In one embodiment, there is disclosed a radiator support bracket assembly for use with radiators. The support bracket assembly may include a longitudinal member having a length with opposing first and second ends, and a width; the length and width of sufficient dimension to accommodate at least one side of a radiator assembly. The longitudinal member may include a mounting structure to attach to a vehicle structural member to provide additional stability for dampening vibrations. A transverse bracket member may be provided which is adapted to overfit internal coolant tubes of the radiator. The bracket member may be of a material that is compatible with radiator coolant and radiator tubes. In one application, the material of choice may be brass, but in other applications, aluminum, composite material and/or plastics may be used.

The bracket member has a length with opposing first and second ends, and a width, and is equipped with at least one aperture along its width located complementary to at least one radiator tube to permit insertion of the transverse bracket member over the radiator tube such that the tube extends through the aperture. The transverse bracket member may be affixed at its first end to the longitudinal member.

In another embodiment, there is disclosed a vibration dampened radiator structure. The vibration dampened radiator structure may include a vehicle radiator having a core with coolant tubes, the core being contained within a shell. The shell has two opposed longitudinal members and two opposed transverse members. Each one of the longitudinal members and transverse members has a length and a width sufficient to accommodate the radiator core, and the combination of the shell and core form a coolant jacket. One transverse member is equipped with an aperture to permit addition of coolant to the coolant jacket and the other transverse member is equipped with an aperture to accommodate a return conduit to accommodate circulation of coolant within the radiator of the engine. The assembly includes a radiator support bracket assembly equipped with a longitudinal member having a length with opposing first and second ends, and a width; each of the length and width of sufficient dimension to accommodate at least one side of a radiator assembly. The radiator support bracket assembly includes a bracket member adapted to overfit internal coolant tubes of the vehicle radiator. The bracket member is made of a material compatible with radiator coolant and the radiator's coolant tubes. The bracket member has a length with opposing first and second ends, and a width, and is equipped with at least one aperture along its width located complementary to at least one radiator coolant tube to permit insertion of the bracket member over the radiator coolant tube such that the coolant tube extends through the aperture. The bracket member may be affixed at the first end to the longitudinal member.

DETAILED DESCRIPTION

Figure 1:
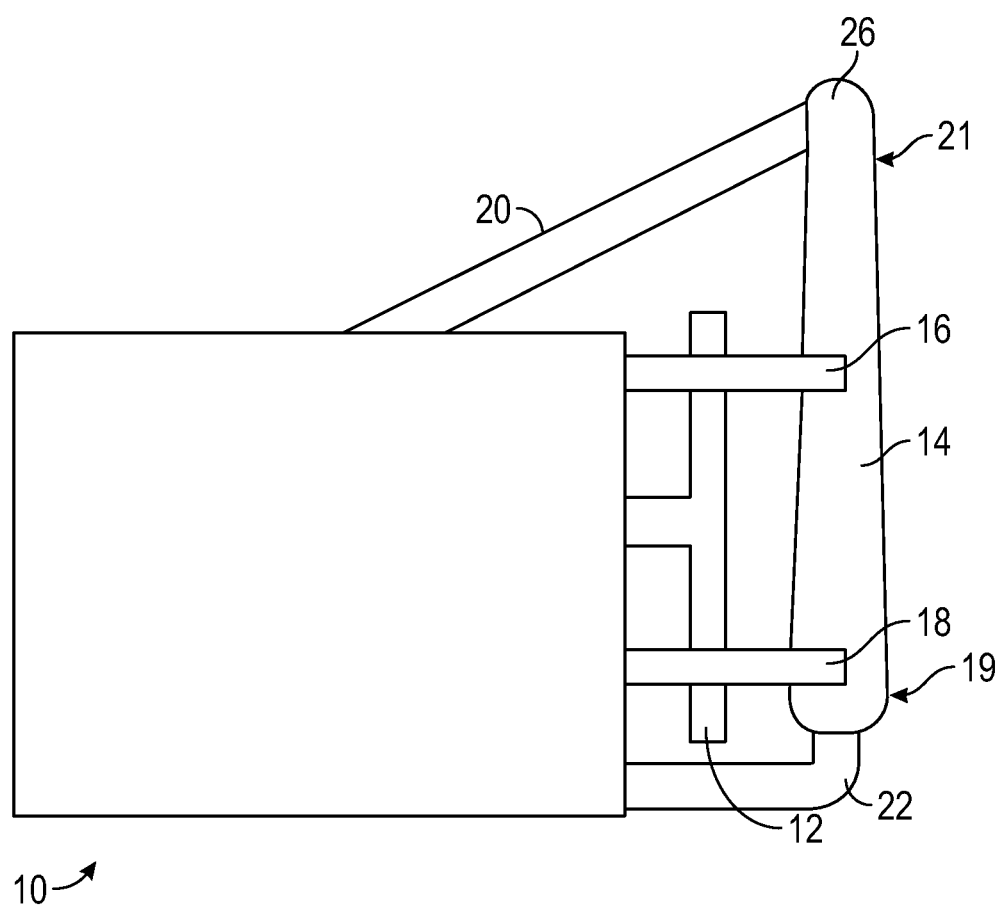
FIG. 1 is a schematic representation of a vehicle engine having a vibration dampened radiator assembly mounted thereto.

Turning now to the drawings wherein like numbers refer to like structures, there is shown a radiator configuration that is exemplary and not limiting. Specifically, engine 10 has an engine fan 12 and radiator 14 mounted to it by braces 16 and 18 as shown FIG. 1. Conduits 20 and 22 are provided to accommodate coolant circulation in a manner well understood by those skilled in the art. The radiator 14 contains a core 56, which comprises coolant tubes 54 (see FIG. 3). The core 56 is contained within a shell 19. The shell 19 comprises two opposed longitudinal members 26 and two opposed transverse members 25. The shell 19 and core 56 combine to form a coolant jacket 21.

Figure 2:
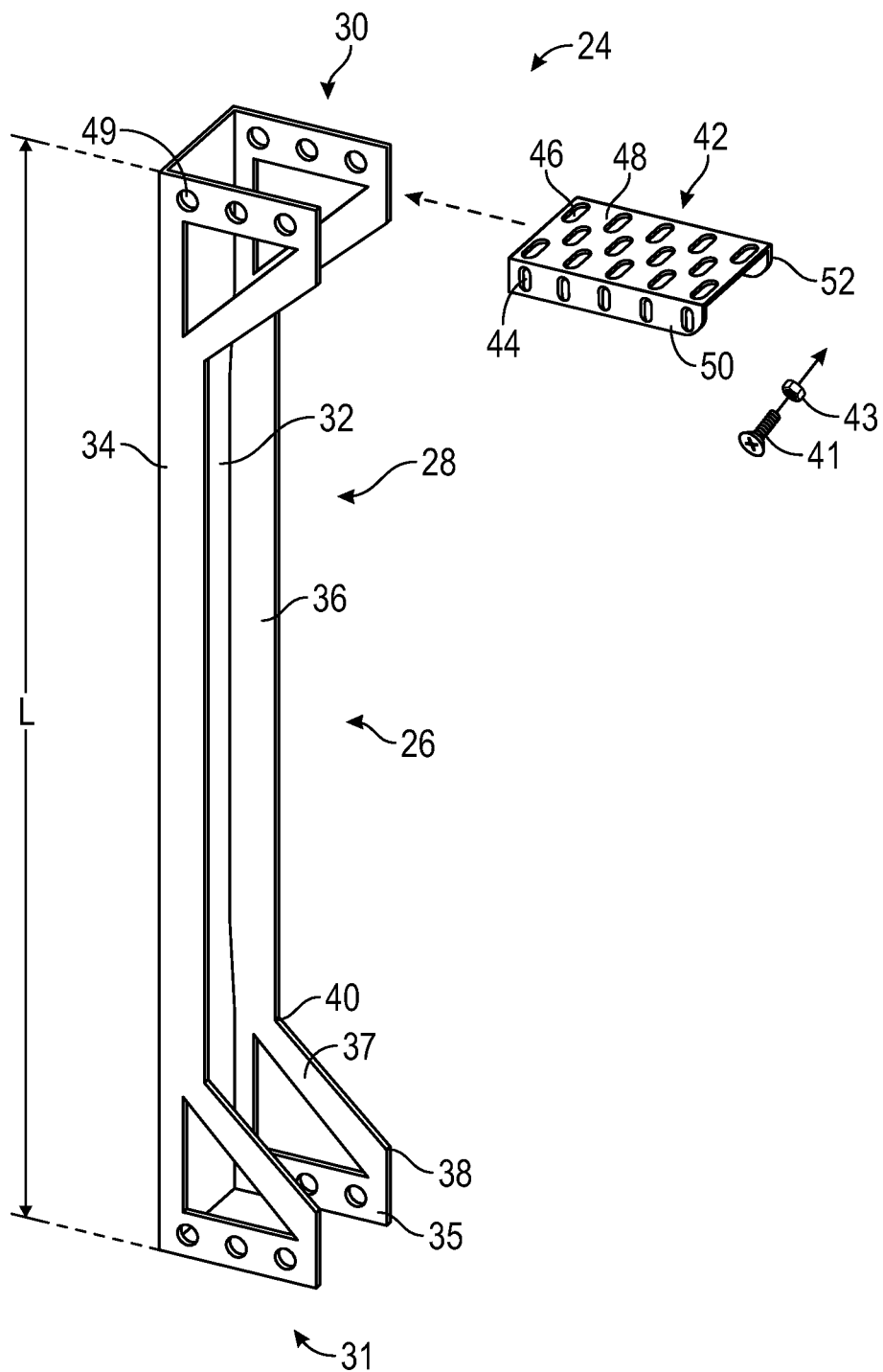
FIG. 2 is an exploded sectional view of one embodiment of the radiator support bracket assembly.

Turning to FIG. 2, there is shown an exploded view of one embodiment of the radiator support bracket assembly 24. Specifically, longitudinal member 26 has a body portion 28 having a length "L" terminating in opposing first and second end portions 30 and 31.

The longitudinal member 26 may be constructed of a metal or other suitable material. The longitudinal member 26 has a longitudinal planar back 32, supporting and separating two longitudinal opposed side members 34 and 36, each of which is substantially perpendicular to the longitudinal planar back 32. The width of the longitudinal planar back 32 is adapted to accommodate the width of a radiator 14, and may be of any size. Similarly, the longitudinal opposed side members 34 and 36 are dimensioned to facilitate a good fit between the longitudinal member 26 and the radiator core 56.

In the embodiment shown in FIG. 2, longitudinal member 26 is illustrated having its longitudinal opposed side members 34 and 36 terminating in transverse sections 35 at both the first and second end portions 30 and 31 of the longitudinal member 26. The transverse sections 35 are shown extending substantially perpendicular to the plane of the longitudinal planar back 32 of the longitudinal member 26. There is further provided a support strut 37 that extends from the end 38 of each transverse section 35 to a position 40 along the length of the longitudinal opposed side members 34 and 36 to lend structural stiffness to the transverse sections 35 and to each longitudinal member 26 as a whole.

A bracket member 42 is fixable to the longitudinal member 26 at the transverse sections 35 in any suitable manner. The bracket member 42 has a length and a width with a planar back 48 separating two opposed sides members 50 and 52. As shown in this embodiment, each side member is equipped with apertures 44 which are complementary to apertures 49 on the transverse sections 35. The apertures 44 are shown as oblong, such that the bracket member 42 is adjustable in a vertical direction for the length of the oblong apertures 44 to accommodate a more custom fit to the transverse sections 35 in a manner to be hereinafter described. In this manner, the bracket member 42 may be secured in place to the transverse sections 35 of the longitudinal member 26 by nut 43 and bolt 41 assemblies, rivets (not shown) or any other suitable manner to secure the bracket member 42 in place once the bracket member 42 is in the proper position relative to the radiator coolant tubes 54. The bracket member 42 is made of a material that is compatible with the coolant in the radiator 14 and the coolant tubes 54 so that galvanic corrosion is substantially reduced or eliminated. Suitable materials may include brass, aluminum, composite materials, plastics or any other material that is compatible with the coolant and the coolant tubes 54. The planar back 48 has at least one, and in some embodiments a plurality of apertures 46 configured to accommodate the shape of the coolant tubes 54 of the radiator's core 56.

Figure 3:
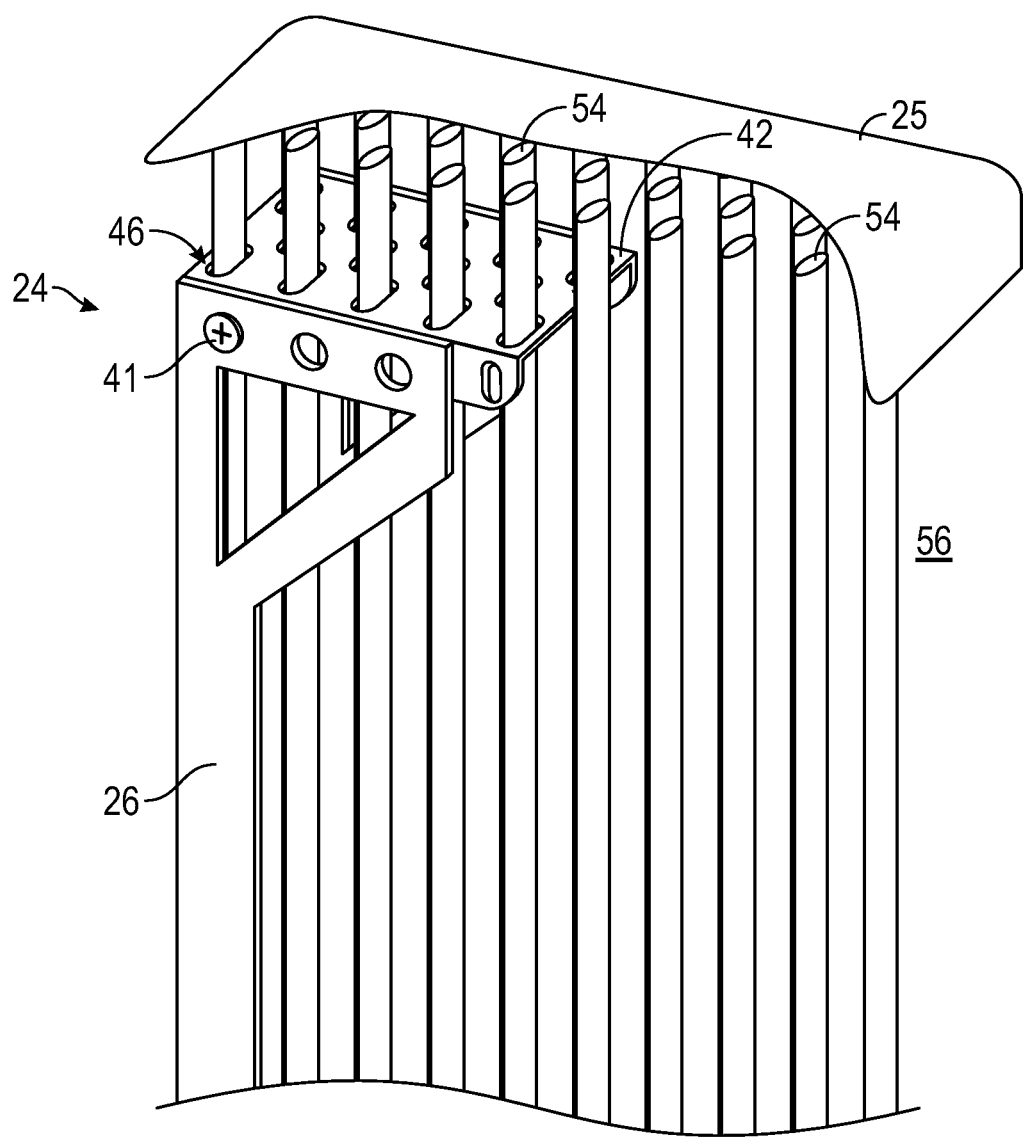
FIG. 3 is a detailed cut away view of an exemplary radiator assembly depicting a bracket member's interaction with the radiator's coolant tubes, and the bracket member in position to be secured to transverse sections of a longitudinal member.

In one mode of operation, the bracket member 42 is placed over the coolant tubes 54 and positioned along the radiator core 56 to a desired position. The longitudinal member 26 is then placed along the side of the radiator 14 and the bracket member 42 is fixed into the desired position as seen in FIG. 3. When the engine 10 is in operation, vibrations from the engine will not be transmitted directly to the radiator core 56, but rather they are dampened by the described radiator support bracket assembly 24, thereby reducing stresses and vibrations to the radiator core 56, and contributing to optimal service life for the radiator 14.

The words used herein are understood to be words of description and not words of limitation. While various embodiments have been described, it is apparent that many variations and modifications are possible without departing from the scope and sprit of the invention as set forth in the appended claims.

What is claimed as new and desired to be protected by Letters Patent of the United States is:

1. A radiator support bracket assembly, comprising:
   a longitudinal member having a length with opposing first and second ends, and a width; said length and width of sufficient dimension to accommodate at least one side of a radiator assembly; and
   a bracket member adapted to overfit internal coolant tubes in said radiator; said bracket of a material compatible with radiator coolant and said radiator tubes; said bracket having a length with opposing first and second ends, and a width, said bracket equipped with at least one aperture along the width located complementary to at least one said radiator tube to permit insertion of said bracket over said radiator tube such that the tube extends through said aperture;
   said bracket affixed at said first end to said longitudinal member.

2. The radiator support bracket assembly of claim 1, further including a plurality of apertures in said bracket member complementary with all the radiator tubes along the length of said bracket member.

3. The radiator bracket assembly of claim 1, wherein said bracket member is comprised of brass.

4. The radiator support bracket assembly of claim 1, further including a mounting structure adapted to a vehicle engine compartment structural component.

5. A radiator support bracket assembly, comprising:
   a longitudinal member having a length and a width, said length having opposed first and second end portions, and said longitudinal member having at least one transverse section extending from at least one of said first end portion and said second end portion; and
   a bracket member, said bracket member comprising:
   a planar back, said planar back having a plurality of apertures that allow for a plurality of radiator coolant tubes to be inserted through said plurality of apertures; and
   opposed side members, said opposed side members separated by said planar back, and said opposed side members configured to be secured to said transverse section of said longitudinal member.

6. The radiator support bracket assembly of claim 5, wherein at least one of said opposed side members of said bracket member has a plurality of apertures, and said transverse section of said longitudinal member has a plurality of apertures, said plurality of apertures of said opposed side member of said bracket member being complimentary to said plurality of apertures of said transverse section of said longitudinal member to allow for said bracket member to be secured to said transverse section of said longitudinal member.

7. The radiator support bracket assembly of claim 5, wherein said width of said longitudinal member is defined by a longitudinal planar back, said longitudinal planar back separating longitudinal opposed side members, said longitudinal opposed side members both being substantially perpendicular to said longitudinal planar back.

8. The radiator support bracket assembly of claim 7, wherein said transverse section of said longitudinal member extends from at least one of said longitudinal opposed side members of said longitudinal member, said transverse section extending substantially perpendicular to said longitudinal planar back.

9. The radiator support bracket assembly of claim 7, wherein at least one of said first end and said second end of said longitudinal member has transverse sections extending from both of said longitudinal opposed side members, said transverse sections extending substantially perpendicular to said longitudinal planar back.

10. The radiator support bracket assembly of claim 7, wherein a support strut extends from an end portion of said transverse section to a position along a length of said longitudinal opposed side member.

11. The radiator support bracket assembly of claim 7, wherein said longitudinal member comprises at least two transverse sections extending from its first end and at least two transverse sections extending from its second end, said transverse sections extending from said longitudinal opposed sides, said transverse sections extending substantially perpendicular to said longitudinal planar back.

12. The radiator support bracket assembly of claim 5, wherein said longitudinal member has bracket members secured to both its said first and second ends.

13. The radiator support bracket assembly of claim 5, wherein said bracket member is made of brass.

14. A radiator assembly, comprising:
   a shell, said shell comprising opposed longitudinal members and opposed transverse members;
   a core, said core comprising a plurality of coolant tubes, said core contained within said shell to form a coolant jacket;
   a radiator support bracket assembly, comprising:
   a bracket member, said bracket member having a planar back separating two opposed side members, said bracket member having a plurality of apertures along its planar back to allow for said bracket member to overfit said plurality of coolant tubes;

at least one of said opposed longitudinal members of said shell having a length and a longitudinal planar back, said longitudinal planar back extending along said length; and said longitudinal member having opposed first and second end portions at each end of its said length, at least one of said end portions having a transverse section extending substantially perpendicular to said longitudinal planar back, and at least one of said opposed side members of said bracket member adapted to be secured to said transverse section.

15. The radiator assembly of claim 14, wherein said longitudinal planar back of said longitudinal member separates longitudinal opposed side members along said length of said longitudinal member, said longitudinal opposed side members extending substantially perpendicular to said longitudinal planar back.

16. The radiator assembly of claim 15, wherein at least one of said first end and said second end portions of said longitudinal member has said transverse sections extending from both of its said longitudinal opposed side members, said transverse sections extending substantially perpendicular to said longitudinal planar back.

17. The radiator assembly of claim 15, wherein said longitudinal member comprises at least two transverse sections extending from its first end portion and at least two transverse sections extending from its second end portion, said transverse sections extending from said longitudinal opposed side members, and said transverse sections extending substantially perpendicular to said longitudinal planar back.

18. The radiator assembly of claim 14, wherein at least one of said opposed side members of said bracket member has a plurality of apertures, and said transverse section of said longitudinal member has a plurality of apertures, said plurality of apertures of said opposed side member being complimentary to said plurality of apertures of said transverse section to allow for said bracket member to be secured to said transverse section of said longitudinal member.

19. The radiator assembly of claim 14, wherein at least one of said opposed longitudinal members of said shell has bracket members secured to said transverse sections at both its said first and second end portions.

20. The radiator assembly of claim 14, wherein both of said opposed longitudinal members of said shell have transverse sections extending from their respective first and second end portions, said transverse sections extending substantially perpendicular to said longitudinal planar backs of said opposed longitudinal members, each longitudinal member of said shell having at least one bracket member secured to at least one transverse section at both its first and second end portions.

* * * * *